Patented Feb. 6, 1923.

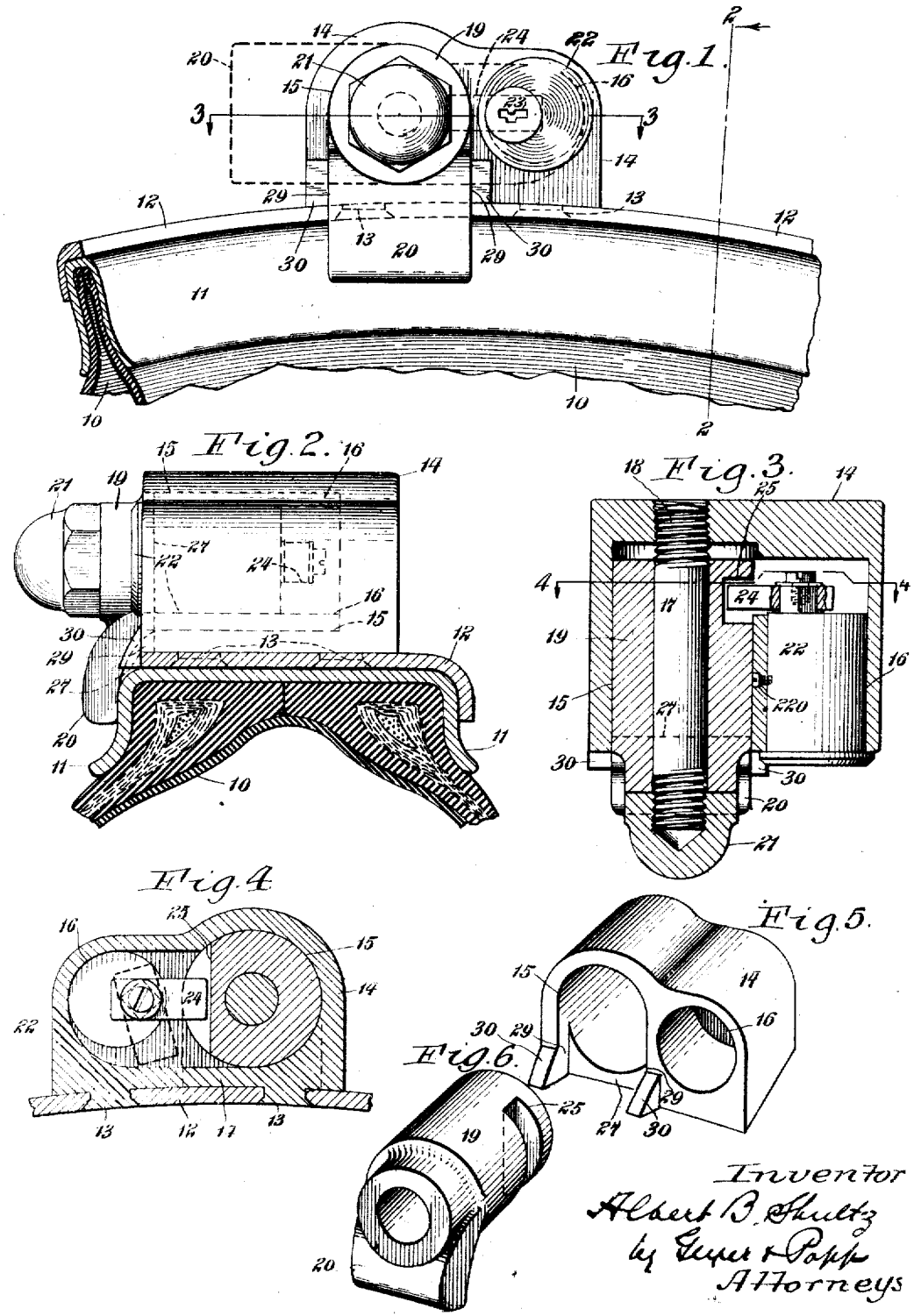

1,444,214

UNITED STATES PATENT OFFICE.

ALBERT B. SHULTZ, OF BUFFALO, NEW YORK.

AUTOMOBILE TIRE LOCK.

Application filed July 28, 1921. Serial No. 488,145.

*To all whom it may concern:*

Be it known that I, ALBERT B. SHULTZ, a citizen of the United States, residing in Buffalo, in the county of Erie and State of New York, have invented new and useful Improvements in Automobile Tire Locks, of which the following is a specification.

This invention relates to an anti-theft deviece for locking the spare automobile tire to the customary tire rack at the rear end of an automobile.

The object of the invention is to produce a strong lock which cannot be opened or forced off by a cold chisel or like instrument and which furthermore is constructed so as to eliminate any noisy rattling and to relieve the comparatively delicate parts of the lock proper from all strain, so that no tendency of the said lock to bind will occur even after a long period of continuous use.

In the accompanying drawings:

Figure 1 is a front end elevation of the complete lock showing the same as applied to a fragmentary tire rack and tire holder. Figure 2 is a side view of the lock showing the tire and tire holder in fragmentary section and taken on line 2—2, Fig. 1. Figure 3 is a horizontal section through the lock taken on line 3—3, Fig. 1. Figure 4 is a vertical transverse section through the lock taken on line 4—4, Fig. 3. Figure 5 is a perspective view of the lock casing. Figure 6 is a perspective view of the barrel with its rectangular tire-retaining tongue.

Similar characters of reference refer to like parts throughout the several views.

10 represents a typical, automobile, pneumatic, rubber tire and 11 a formal metal detachable tire rim upon which the tire is mounted and inflated in the usual and well known manner. This rim is adapted to either be bolted to one of the automobile wheels in the usual way when in use or, when not in use, to be secured to the typical tire rack or holder 12 which is usually situated at and secured suitably to the rear end of the automobile, in which latter case, the tire and rim act in the capacity of a "spare" to be used in case of a leak or blow out in any one of the other tires. The specific object of the present invention is to lock the said metal rim 11 to the said tire rack 12.

Adapted to be permanently secured to the outer upper face of said tire rack 12 by means of integral studs 13 or otherwise, is a lock casing 14 (see Fig. 5) from whose forward outer face extends inwardly and rearwardly a pair of cylindrical holes;—namely a barrel-receiving hole 15 and a lock-receiving hole 16. Arranged concentrically with respect to the barrel receiving hole 15 is an anti-vibration bolt 17 whose rear threaded end 18 is permanently screwed into the rear wall of the casing 14. Adapted to both rotate and to slide upon the said bolt 17 is a concentric barrel 19 provided at its front end with a laterally projecting rectangular tongue 20. The forward end of the said bolt 17 is provided with a suitable screw thread which is engaged by the threaded bore of a cap nut 21, the latter being adapted to be screwed up tightly against the forward end or face of the barrel 19.

Arranged within the aforesaid lock receiving hole 16 is an ordinary cylindrical lock 22 which is suitably held permanently in place by a set screw (cap screw) 220. The head of this screw is countersunk in the periphery of the hole 15, so that by removing the barrel 19 and the anti-vibration bolt 17, this set screw may be removed, and yet not be accessible to an unauthorized person as will be hereinafter more evident. This lock has the usual key slot 23 for the reception of an authorized person's key, and the rear end of the lock is preferably squared and is provided with a laterally extending locking arm 24. The latter is adapted to be received within a transverse locking notch 25 formed transversely in the one side of the rear peripheral surface of the aforesaid barrel 19. It should be noted, however, that the width of the said notch 25 is considerably greater than the width of the locking arm 24, it being intended that the said locking arm shall never be strained or carry any pressure whatsoever, unless the lock be tampered with by an unauthorized person, in which latter case, of course, said locking arm restrains or prevents the longitudinal withdrawal of said barrel similarly to the action of an ordinary lock. Under normal circumstances however, the barrel is held firmly rearwardly by the aforementioned anti-vibration nut 21 which not only prevents any noisy loose rattling of said barrel but also relieves the locking arm 24 of any strain.

Formed in the front face of the lock casing 14 and adjacent to the forward end of the barrel-receiving hole 15, is a rectangular, vertical recess 27 which forms transverse shoulders 29. When the barrel is pressed to its extreme rear position by the anti-vibration cap nut 21, the sides of the tongue 20 thereof bear laterally against the said shoulders 29. Thus any rotation of the said barrel, when in this rearward position, is positively and very strongly prevented.

The drawings show the lock in its locked position in full lines. To unlock the same the authorized person proceeds as follows:

The lock key is first inserted into the key slot 23 and the locking arm 24 is rotated down to the dotted line position of Fig. 4. This frees the barrel 19, as far as the lock 22 is concerned. Then the anti-vibration nut 21 is unscrewed a short distance until the operator is able to move the barrel 19 forwardly a sufficient distance so that the tongue 20 thereof clears the flat shoulders 29 of the rectangular lock casing recess 27, after which the said tongue is swung up to the approximate position of the dotted lines of Fig. 1. If desired, the said tongue 20 may be positively held in this elevated position by temporarily screwing back the nut 21. Said tongue now being out of the way, the tire rim 11 and the tire 10 may be removed as a unit from the tire carrier 12. To lock said tire and rim to said tire holder, the reverse operation is required.

It should be noted that the depth of the shoulders 29 is less than the length of the screw thread on the forward end of the anti-vibration bolt 17. Because of this, it is at no time necessary to completely remove either the nut 21 or the barrel 19. To positively, however, lock the barrel 19 against rotation, it is desirable to form a pair of retaining tongues 30 on the front face of the main casing, said tongues supplementing the action of the retaining shoulders 29 in preventing sidewise movement of the tongue 20, and also prevent a tool from being inserted by unauthorized persons under this tongue in an attempt to pry off the lock and steal the tire. It should also be specifically noted that said nut 21 and also the locking arm 24 both cooperate to hold the barrel 19 rearwardly and restrain longitudinal movement thereof. Under normal circumstances however, the whole strain is carried by the said nut 21 which firmly clamps said barrel and prevents any noisy rattling or vibration thereof. The locking arm 24 only comes into play in case an unauthorized person should remove the nut 21 and tamper with the said barrel 17, but said locking arm 24 would, of course, frustrate such a nefarious intent. When said barrel is in its rearward position, the same is strongly restrained against any attempted rotation by means of the engagement of the sides of the tongue 20 thereof with the aforesaid shoulders 29, so that an unauthorized person is prevented from rotating said barrel even though a cold chisel or like implement is employed.

The lock is inexpensive and operates to not only tightly clamp the barrel 19 in place on the lock casing 14, but also firmly clamps the metal tire rim 11 to the tire rack 12. It is simple and sturdy in construction and requires no delicate operations for its manufacture and is applicable to any tire rim and tire rack now in use. It is neat in appearance and any parts which may fracture (such as the relatively delicate lock 22) may be readily replaced without disturbing the rivets 13 or otherwise mutilating the same. Furthermore it may be easily operated by an authorized person and fills an ever increasing need for a device of this character.

I claim as my invention:

1. An automobile tire lock comprising a casing, a barrel arranged slidably within said casing and provided with a transverse locking notch, means for preventing rotation of said barrel, a tongue projecting from said barrel and adapted to bear against the outer face of the automobile tire rim, and a lock arranged within said casing and adapted to engage with the said transverse locking notch of said barrel.

2. An automobile tire lock comprising a casing, a barrel arranged slidably within said casing and restrained against rotation therein, an anti-vibration nut connected with said casing and bearing against the outer face of said barrel, a tongue extending laterally from said barrel and adapted to bear against the outer face of the automobile tire rim, and a lock arranged in said casing and adapted to restrain longitudinal movement of said barrel.

3. An automobile tire lock comprising a casing having a longitudinal cylindrical hole, a barrel arranged within said hole and restrained against rotation therein, an anti-vibration bolt passing longitudinally through said barrel, an anti-vibration nut engaging with said bolt and adapted to bear against the outer face of said barrel, and a lock adapted to restrain longitudinal movement of said barrel.

4. An automobile tire lock comprising a casing having a recess on its forward face forming a pair of transverse shoulders, a barrel arranged within said casing and longitudinally movable therein, a tongue projecting from said barrel and adapted to extend into said recess and to bear with its lateral sides against the said shoulders of said recess, and a lock adapted to restrain longitudinal movement of said barrel.

5. An automobile tire lock comprising a casing having a pair of longitudinal cylindrical holes formed therein, a barrel arranged in the one hole and a cylindrical lock arranged in the other hole, a locking arm arranged on said cylindrical lock and adapted to engage with said barrel, and a tongue projecting from said barrel and adapted to bear against the outer face of the automobile tire rim.

6. An automobile tire lock comprising a casing, a barrel arranged within said casing and provided with a transverse locking slot, a lock having a locking arm adapted to enter said transverse slot, and an anti-vibration nut connected with said casing and bearing against the outer face of said barrel.

7. An automobile tire lock comprising a casing having a pair of longitudinal cylindrical holes formed therein, a barrel arranged in the one hole and a cylindrical lock arranged in the other hole, a lock set-screw bearing against said lock and having its head arranged in the longitudinal hole which contains the said barrel, and a locking arm arranged on said lock and engaging with said barrel.

8. An automobile tire lock comprising a casing having a comparatively shallow recess, a barrel arranged longitudinally within said casing, an anti-vibration bolt passing through said barrel and having its forward end threaded and extending out from said barrel a distance greater than the depth of the aforesaid recess, an anti-vibration nut engaging with the outer end of said bolt, and a tongue projecting laterally from said barrel and adapted to press against the outer face of the automobile tire rim.

ALBERT B. SHULTZ.